(12) United States Patent
Louh

(10) Patent No.: US 8,693,094 B2
(45) Date of Patent: Apr. 8, 2014

(54) POLARIZER AND FABRICATION METHOD THEREOF

(75) Inventor: Sei-Ping Louh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 657 days.

(21) Appl. No.: 12/780,920

(22) Filed: May 16, 2010

(65) Prior Publication Data

US 2011/0128623 A1 Jun. 2, 2011

(30) Foreign Application Priority Data

Dec. 2, 2009 (CN) .......................... 2009 1 0310762

(51) Int. Cl.
*G02B 5/30* (2006.01)

(52) U.S. Cl.
USPC .................. 359/487.06; 359/900; 427/163.1; 977/847; 977/890; 977/901

(58) Field of Classification Search
USPC ............... 427/163.1; 977/855, 842, 847, 890, 977/901; 359/487.06, 900
See application file for complete search history.

(56) References Cited

U.S. PATENT DOCUMENTS

| | | | |
|---|---|---|---|
| 7,054,064 B2 * | 5/2006 | Jiang et al. ............... | 359/485.05 |
| 7,294,248 B2 * | 11/2007 | Gao ............................. | 204/491 |
| 7,710,649 B2 * | 5/2010 | Feng et al. .................. | 359/489.2 |
| 7,854,991 B2 * | 12/2010 | Hata et al. ...................... | 428/408 |
| 2002/0068170 A1 * | 6/2002 | Smalley et al. ............... | 428/403 |
| 2006/0014375 A1 * | 1/2006 | Ford et al. ..................... | 438/622 |
| 2006/0279842 A1 * | 12/2006 | Kim et al. ..................... | 359/487 |
| 2007/0159577 A1 * | 7/2007 | Atsushi et al. .................. | 349/96 |
| 2009/0267479 A1 * | 10/2009 | Hutchison et al. ............ | 313/309 |
| 2009/0297846 A1 * | 12/2009 | Hata et al. ..................... | 428/367 |
| 2010/0092784 A1 * | 4/2010 | Kamada et al. ............... | 428/426 |
| 2010/0272978 A1 * | 10/2010 | Kumar et al. ................. | 428/220 |
| 2012/0247808 A1 * | 10/2012 | Lam .......................... | 174/126.2 |

FOREIGN PATENT DOCUMENTS

| | | |
|---|---|---|
| CN | 101276012 A | 10/2008 |
| CN | 101548207 A | 9/2009 |
| CN | 101963681 A | 2/2011 |
| KR | 1020080104925 B1 | 5/2009 |

\* cited by examiner

*Primary Examiner* — Ricky D Shafer

(74) *Attorney, Agent, or Firm* — Novak Druce Connolly Bove + Quigg LLP

(57) ABSTRACT

A method for manufacturing a polarizer utilizes a support, which is coated with a photoresist. A carbon nanotube film is located over the photoresist, and one portion of the carbon nanotube film is submerged in the photoresist. Metal or semi-metallic particles are deposited over the carbon nanotube film and the photoresist, which is removed. The carbon nanotube film with the metal particles or semi-metallic particles is adhered to a substrate to obtain the polarizer.

3 Claims, 4 Drawing Sheets

POLARIZER AND FABRICATION METHOD THEREOF

BACKGROUND

1. Technical Field

The present disclosure relates to optical components, and especially to a polarizer and a fabrication method thereof.

2. Description of Related Art

Optical polarizers are widely used in devices such as cameras and liquid crystal displays (LCDs) for altering light paths.

A commonly used dichroic polarizer is usually fabricated by incorporating dye molecules into polymer chains oriented along one axis. The polymer chains of the dichroic polarizers are usually formed from polyvinyl alcohol (PVA). The dichroic dye molecules are oriented along the same axis as the polymer chains to form dye chains. Accordingly, the incident light vibrate parallel to the dye chains and are absorbed by the polarizer; and the incident light vibrate perpendicularly to passage of the dye chains through the polarizer. Thus, the polarizer allows the passage of light linearly polarized in only one orientation.

However, the polarizer made by polymer chains provides poor polarization above 50° C. or in a moist environment. In addition, the method of fabricating the polarizer made by polymer chains is quite complicated.

Therefore, it is desirable to provide a polarizer which has better reliability and simpler fabrication.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture device and control method thereof. Moreover, in the drawings, like reference numerals designate corresponding parts throughout the views.

DETAILED DESCRIPTION

Embodiments of the disclosure will now be described in detail with reference to the accompanying drawings.

Figure 1:
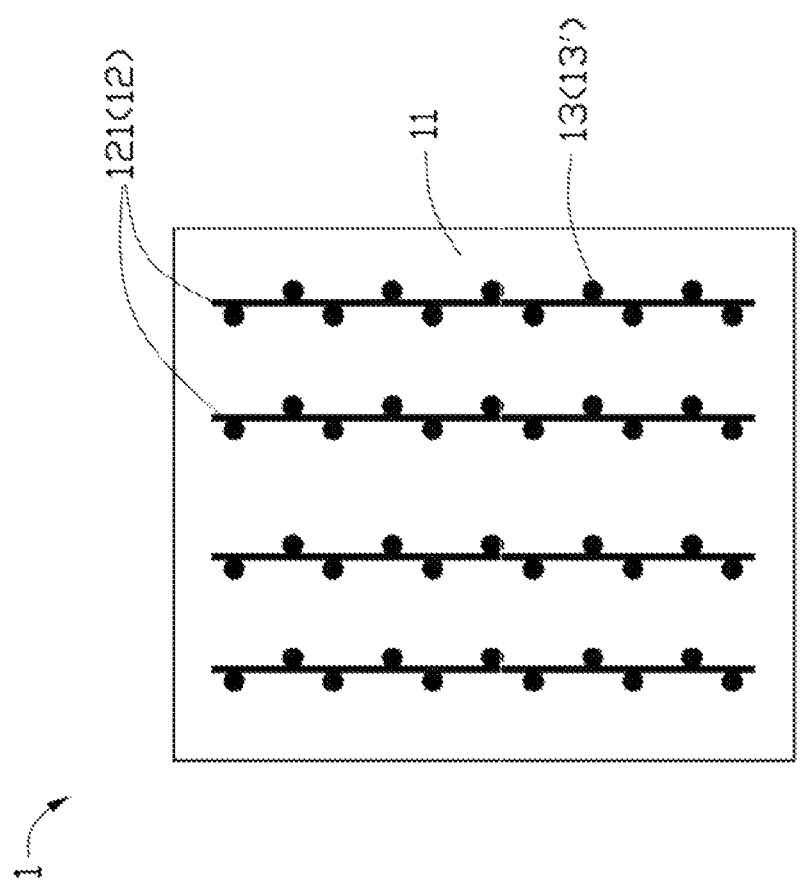
FIG. 1 is a schematic view of one embodiment of a polarizer of the present disclosure.

As shown in FIG. 1, one embodiment of a polarizer 1 according to the present disclosure includes a substrate 11, a carbon nanotube film 12 and a plurality of particles, such as metal particles 13 or semi-metallic particles 13'. The carbon nanotube film 12 is located on the substrate 11, and the metal particles 13 or the semi-metallic particles 13' are adhered to the carbon nanotube film 12.

The substrate 11 is a base member of the optical component, and may be plastic or light-cured adhesive, such as ultraviolet-cured (UV-curable) adhesive in this embodiment.

The carbon nanotube film 12 includes a plurality of carbon nanotube yarns 121, and each carbon nanotube yarn 121 includes a plurality of parallel bundled carbon nanotubes. Distances between the adjacent carbon nanotube yarns 121 are substantially the same in this embodiment. In other words, each of the carbon nanotube yarns 121 essentially consists of carbon nanotubes interconnected in serial through terminals with the carbon nanotube film 12 essentially consisting of the carbon nanotube yarns 121 parallel to and apart from each other. With such regular arrangement of the carbon nanotubes, light having a polarization parallel to the carbon nanotubes is absorbed and light having a polarization perpendicular to the carbon nanotubes passes through the polarizer 1, resulting in polarized light transmitted from the polarizer 1. It is noted that the carbon nanotube film 12 and, accordingly, polarizer 1, may have different polarization abilities in accordance with light of different wavelengths.

The metal particles 13 or semi-metallic particles 13' adhere to the carbon nanotubes of the carbon nanotube film 12 by deposition. The polarization ability of the optical polarizer 1 varies with the materials of the deposition particles and the deposition thickness. In this embodiment, the metal particles 13 are gold, silver, or iron; and the semi-metallic particles 13' can be iodine.

Figure 2:
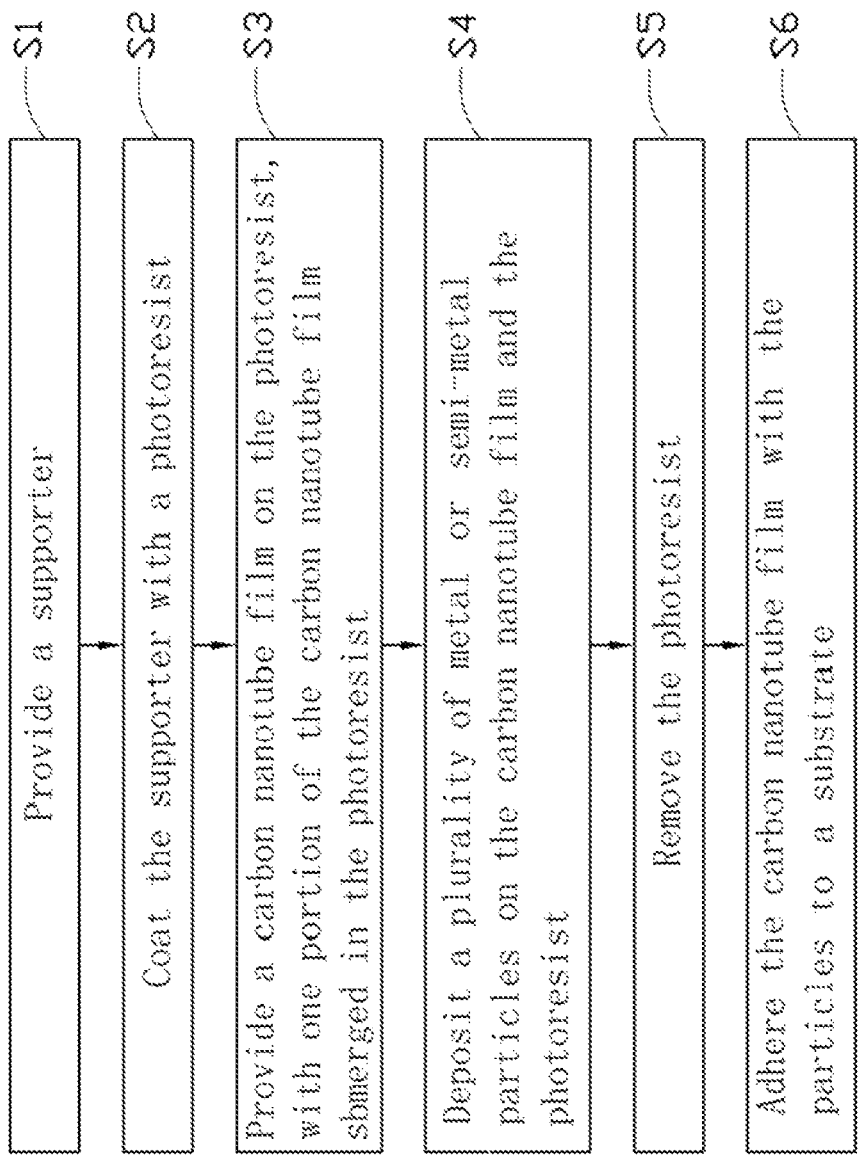
FIG. 2 is a flowchart of a polarizer fabrication method according to an embodiment of the present disclosure.
Figure 3:
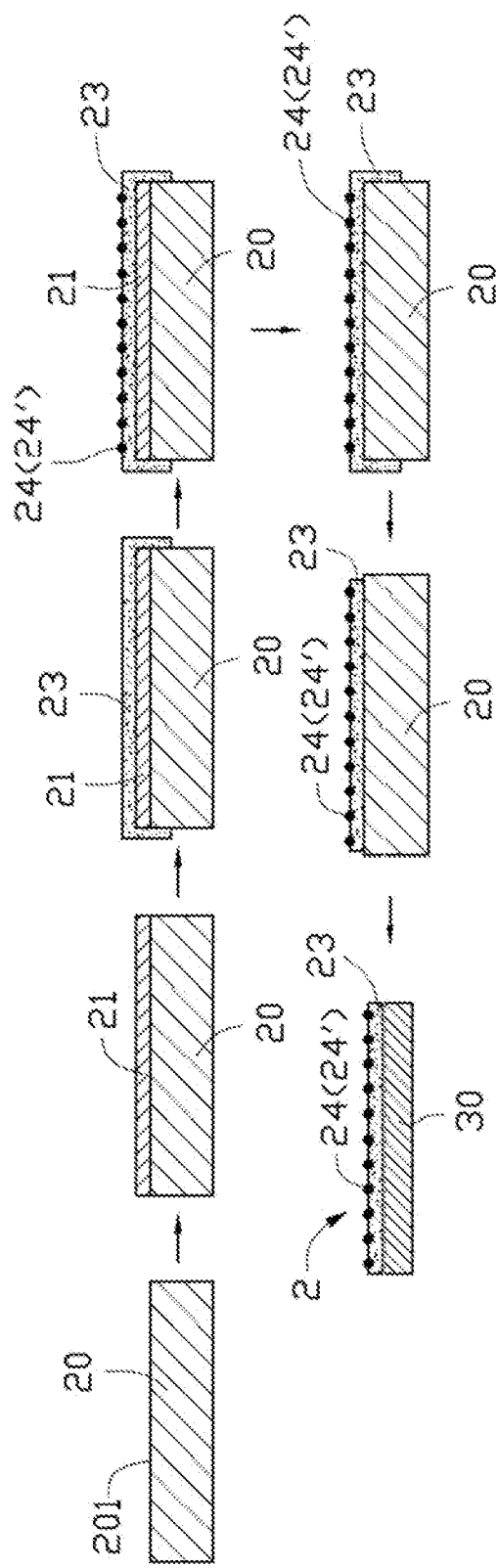
FIG. 3 is a schematic view showing successive stages of the method of FIG. 2.

As shown in FIG. 2 and FIG. 3, one embodiment of a method of fabricating a polarizer 2 according to the present disclosure follows. In Step 1, a support 20 is provided. In step S2, the support 20 is coated with a photoresist 21. In Step S3, a carbon nanotube film 23 is provided over the photoresist 21 with one portion of the carbon nanotube film 23 submerged in the photoresist 21. In Step S4, a plurality of metal particles 24 or semi-metallic particles 24' are deposited over the carbon nanotube film 23 and the photoresist 21. In Step S5, the photoresist 21 is removed. In Step S6, the carbon nanotube film 23 with the metal particles 24 or semi-metallic particles 24' is adhered to a substrate 30 so as to form the polarizer 2. Steps S1 to S6 are further described in detail as follows.

In Step S1, the support 20 may be a substrate having a smooth surface. For example, the support 20 may be a silicon substrate having a smooth surface 201 formed by polishing process in this embodiment.

In Step S2, the smooth surface 201 of the support 20 is coated with the photoresist 21 by a coating process, such as spin coating. The photoresist 21 may be a positive photoresist, of a thickness of about 100 μm, and softly cured by UV light in a pre-curing process in this embodiment. It should be noted that the photoresist 21 is not completely cured by the pre-curing process, and is still elastic. The pre-curing process simply retains the photoresist 21 in a solid state. The elasticity of the photoresist 21 can be controlled by the intensity of the UV light.

Figure 4:
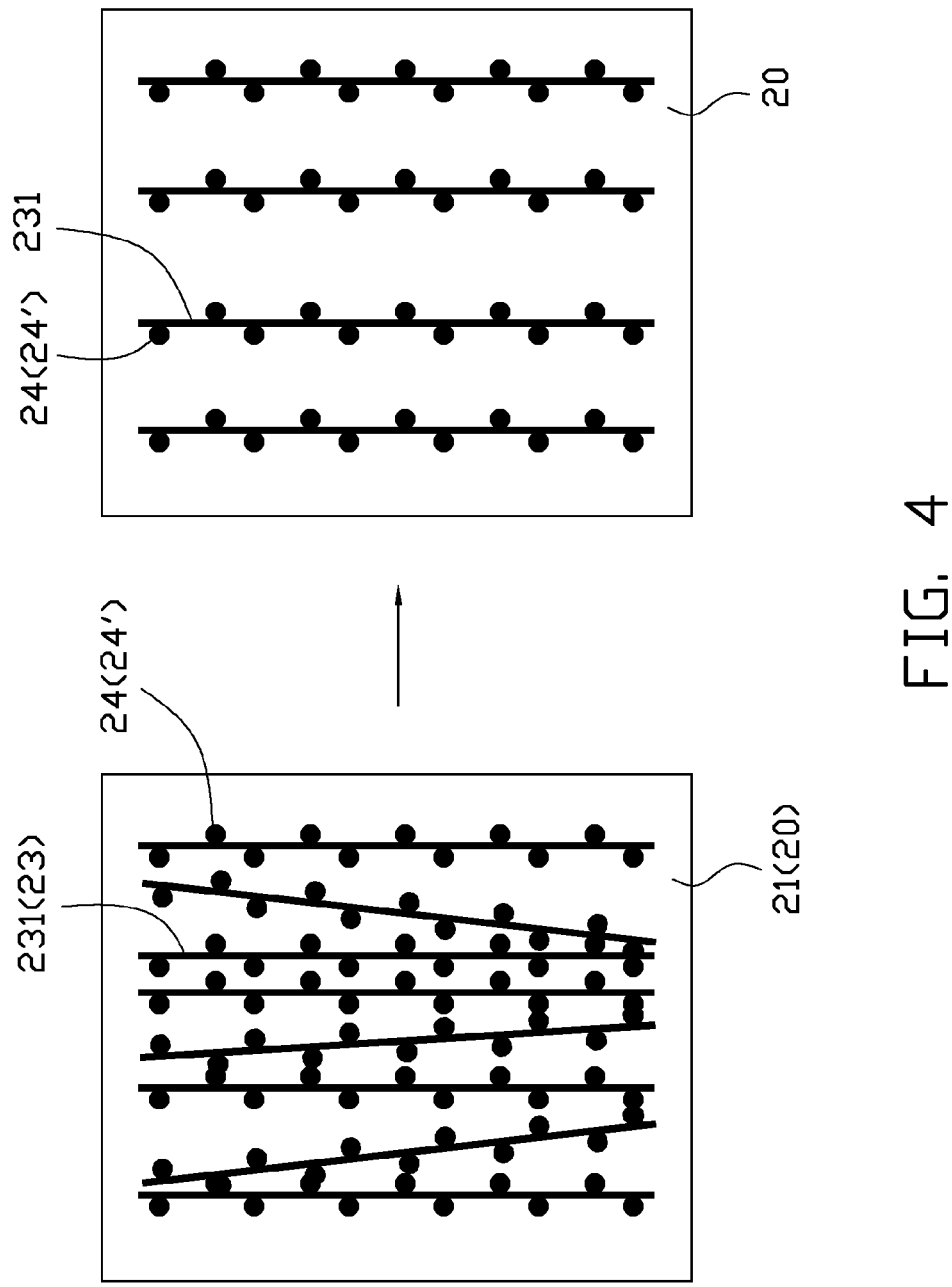
FIG. 4 is a schematic top view illustrating removal of the carbon nanotubes in the method of FIG. 3.

In Step S3, the carbon nanotube film 23 is placed over the photoresist 21. Since the carbon nanotube film 23 is disposed on the partially-cured photoresist 21, one portion of the carbon nanotube film 23 is submerged in the photoresist 21. In this case, the carbon nanotube film 23 is formed by extending a carbon nanotube matrix including a plurality of carbon nanotubes. Therefore, a plurality of carbon nanotube yarns 121 are formed as shown in FIG. 4, and each carbon nanotube yarn 121 includes a plurality of parallel bundled carbon nanotubes. Accordingly, the carbon nanotube yarns 231 are substantially parallel to the surface of the carbon nanotube film 23. For each carbon nanotube yarn 231, the carbon nanotubes are interconnected through their terminals by van der Waals' forces. The adjacent carbon nanotube yarns 231 might be interconnected through the other carbon nanotubes.

In Step S4, the detail deposition procedure depends on the type of the deposition particles. If the particles are metal, metal particles 24 are deposited by evaporation or sputtering. The deposition metal particles 24 are located on the surfaces of the carbon nanotubes and the photoresist 21 and may be gold, silver, or iron.

If the particles are semi-metallic, the photoresist 21, the carbon nanotube film 23 and the support 20 are submerged in a semi-metallic solution, such as an iodine solution. Thus, the semi-metallic particles 24' are deposited on the surfaces of the carbon nanotube film 23 and the photoresist 21.

The type of deposition particles used may depend on the product design, with polarization ability of the optical polarizer 1 varying therewith. As a result, the materials of the metal particles 24 or semi-metallic particles 24' can be selected according to the corresponding wavelength ranges.

In Step S5, the photoresist 21 can be removed by a developer solution after Step S4, with carbon nanotube film 23 and metal particles 24 or semi-metallic particles 24' located thereon remaining on the support 20.

Thereafter, the carbon nanotubes interconnected with the adjacent carbon nanotube yarns 231 may be optionally removed. The carbon nanotubes are removed by laser, knife, diamond wheel or other cutting tool. Regular cutting renders the carbon nanotube yarns 121 substantially equidistant with carbon nanotubes remaining in the carbon nanotube film 23 regularly arranged, as shown in FIG. 4. In other embodiments, a protective film (not shown) may be optionally provided before removing the carbon nanotubes. The protective film can enhance the structural strength by protecting the carbon nanotube film 23 during the cutting.

Step S6 may include, coating the carbon nanotube film 23 with an UV-curable adhesive after the photoresist 21 is removed. Thus, the carbon nanotube film 23 is submerged in the UV-curable adhesive. Subsequently, the UV-curable adhesive is cured so that the carbon nanotube film is fixed in the UV-curable adhesive. Next, the support is removed, and a polarizer 2 is formed with the cured UV-curable adhesive as the substrate 30 thereof.

In other embodiments, Step S6 may alternately include adhering the carbon nanotube film 23 with the particles to a plastic plate and removing the support 20. In such a case, the plastic plate is the substrate 30 of the polarizer 2.

In sum, the polarizer of the present disclosure includes a plurality of carbon nanotubes regularly arranged for polarization, and the metal or semi-metallic particles can enhance the polarization ability of the polarizer. In addition, the method of fabricating the polarizer with the carbon nanotube film benefits from the simpler procedure and lower manufacturing cost.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A method for forming a polarizer, comprising:
   providing a support;
   coating the support with a photoresist;
   providing a carbon nanotube film on the photoresist;
   depositing a plurality of metal or semi-metallic particles on the carbon nanotube film and the photoresist;
   removing the photoresist; and
   adhering the carbon nanotube film with the particles to a substrate to form the polarizer.

2. The method of claim 1, wherein the carbon nanotube film comprises a plurality of carbon nanotube yarns, each carbon nanotube yarn comprising a plurality of parallel bundled carbon nanotubes.

3. The method of claim 2, wherein distances between the carbon nanotube yarns are substantially the same.

* * * * *